United States Patent [19]
Ernst

[11] Patent Number: 5,548,902
[45] Date of Patent: Aug. 27, 1996

[54] MULTI-COORDINATE PROBE

[75] Inventor: Alfons Ernst, Traunreut, Germany

[73] Assignee: Dr. Johannes Heidenhain GmbH, Traunreut, Germany

[21] Appl. No.: 280,863

[22] Filed: Jul. 26, 1994

[30]   Foreign Application Priority Data

Jul. 31, 1993 [DE] Germany .......................... 43 25 743.7

[51] Int. Cl.$^6$ .................................................. G01B 5/016
[52] U.S. Cl. .................. 33/561; 33/559; 33/558
[58] Field of Search ............................ 33/556, 557, 558, 33/559, 560, 561; 73/865.8

[56]               References Cited
                U.S. PATENT DOCUMENTS

| | | | |
|---|---|---|---|
| 3,554,017 | 1/1971 | Wernsing | 33/561 |
| 4,084,323 | 4/1978 | McMurtry | 33/561 |
| 4,473,955 | 10/1984 | McMurtry . | |
| 4,763,421 | 8/1988 | Feichtinger . | |
| 5,029,399 | 7/1991 | McMurtry | 33/559 |
| 5,119,568 | 6/1992 | Vesco et al. | 33/559 |
| 5,209,131 | 5/1993 | Baxter | 33/559 |
| 5,228,205 | 7/1993 | Bertz et al. | 33/560 |
| 5,326,982 | 7/1994 | Wiklund | 33/558 |

FOREIGN PATENT DOCUMENTS

| | | | |
|---|---|---|---|
| 0270322 | 8/1988 | European Pat. Off. . | |
| 0361164 | 4/1990 | European Pat. Off. . | |
| 0551164 | 7/1993 | European Pat. Off. . | |
| 2347633 | 4/1974 | Germany . | |
| 140788 | 3/1980 | Germany . | |
| 3508396 | 9/1985 | Germany . | |
| 3530229 | 2/1986 | Germany . | |
| 3725205 | 2/1989 | Germany . | |
| 239001 | 10/1987 | Japan | 33/559 |
| 2129133 | 5/1984 | United Kingdom | 33/556 |
| 2042189 | 9/1990 | United Kingdom . | |

*Primary Examiner*—Thomas B. Will
*Attorney, Agent, or Firm*—Anderson Kill Olick & Oshinsky, P.C.

[57]               ABSTRACT

A multi-coordinate probe including a housing, at least one tracer pin for scanning an object and deflectable in a plurality of coordinate directions upon engagement with the object, and a support for supporting the tracer pin in the housing and formed of a plurality of multi-arm leaf springs having each at least one axially extending spring component.

6 Claims, 2 Drawing Sheets

MULTI-COORDINATE PROBE

BACKGROUND OF THE INVENTION

The invention relates to a multi-coordinate probe including at least one, deflectable in several coordinate direction, tracer pin for scanning an object, elastic means for supporting the tracer pin in the probe housing, and a plurality of sensors for detecting the deflection of the tracer pin.

The multi-coordinate probe of the above-described type is disclosed by different prior art references. The sensors, which are used for detecting the deflection of the pin upon its engagement with the scanned object, may be of different types. E.g., as a sensor, an electrical switch, a photoelectrical system, or a range sensor can be used. The described probe is disclosed in German patents 2,347,633 and 3,508,396 and in European Patent and in European Patent application No. 0 361 164.

When a multi-coordinate probe of the above-mentioned type is used for scanning an object, it has its spacer pin, which is provided at an end thereof with a feeler ball, deflected by the object, and the sensors generate a measuring signal reflecting the amount of deflection.

The object of the invention is multi-coordinate probe of the above-described type having elastic means supporting the tracer pin in the housing, which has a relatively simple structure and at the same time insures high precision of measurement of the tracer pin deflection and high sensibility.

SUMMARY OF THE INVENTION

This and other objects of the invention, which will become apparent hereinafter, are achieved by providing a multi-coordinate probe of the above-mentioned type in which the elastic means comprises spring means formed of a plurality of multi-arm leaf springs each of which has at least one axially extending component.

The advantage of the multi-coordinate probe according to the present invention lies in that even a small deflection force causes outputting of a measuring signal, which can be used as a switch signal and a measuring signal. A particular advantage of the multi-coordinate probe according to the invention consists in that it permits to achieve a large lift of the tracer pin in axial direction.

BRIEF DESCRIPTION OF THE DRAWINGS

The features and objects of the present invention will become more apparent, and the invention itself will be best understood from the following detailed description of the preferred embodiments when read with references to the appended drawings, wherein.

DETAILED DESCRIPTION OF THE PREFERRED EMBODIMENT

Figure 1:
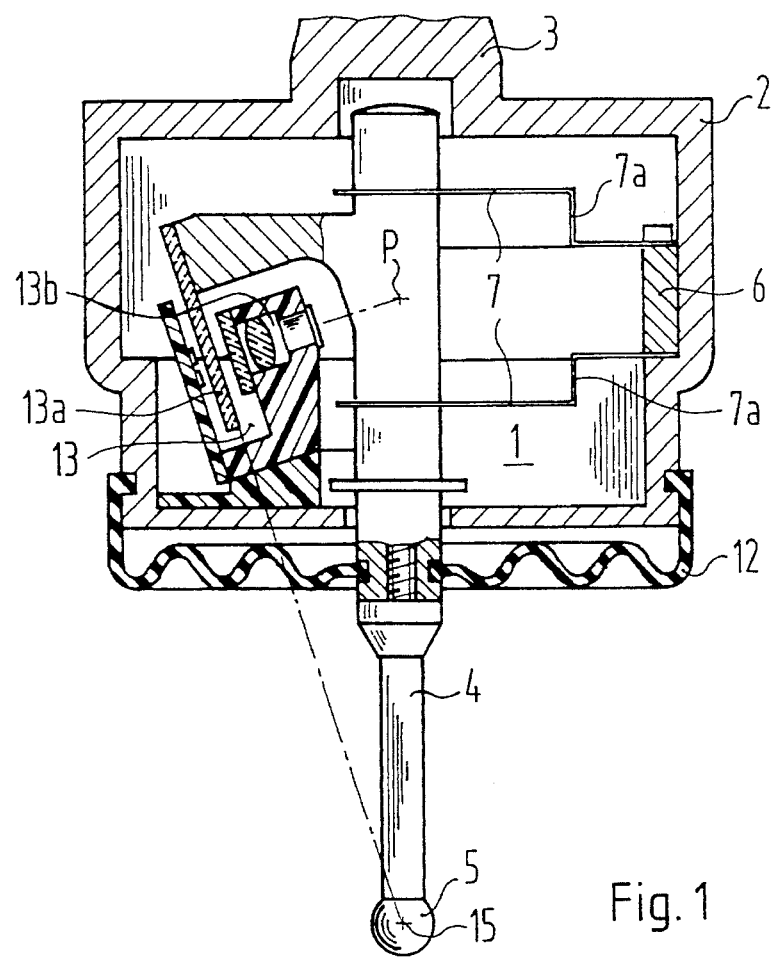
FIG. 1 shows a cross-sectional view of a multi-coordinate probe according to the present invention taken along line 1—1 in FIG. 2.

A multi-coordinate probe 1 according to the present invention, which is shown in FIG. 1, includes a housing 2 having a shaft 3 with which the probe can be secured in an appropriate machine. A tracer pin 4 projects from the housing 2 in a direction which is opposite to the direction in which the mounting shaft extends. The tracer pin 4 has at an end thereof a feeler ball 5. The tracer pin 4 is supported in the housing 2 by spring means 6 which comprises a plurality of leaf springs 7, which are in this embodiment has a shape of a cross, connected with the housing 2. A bellows member 12 sealingly closes the open tracer pin side of the housing 2.

Figure 1A:
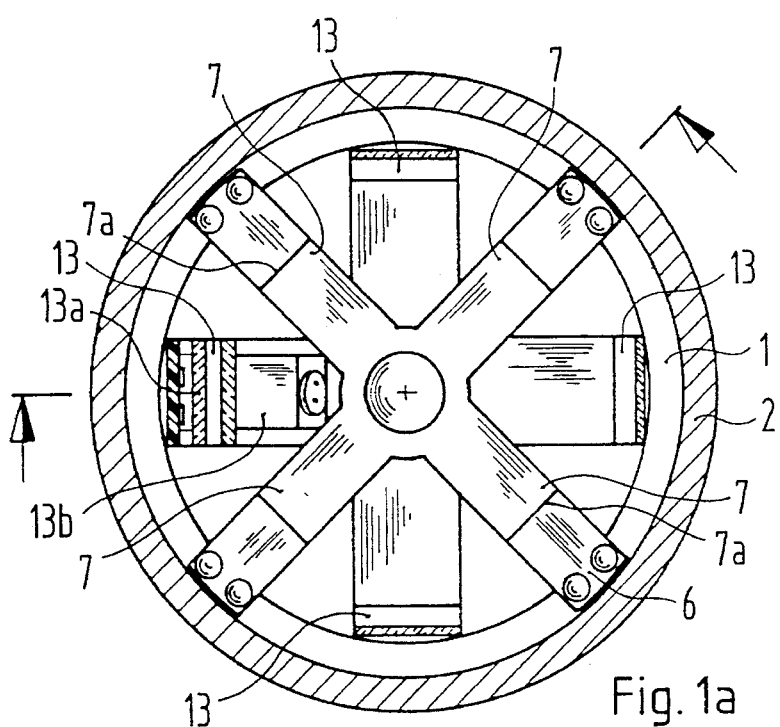
FIG. 1a shows a plan view of the multi-coordinate probe shown in FIG. 1.

The arrangement of the leaf springs can be seen in the plan view shown in FIG. 1a, which also shows the arrangement of four sensors 13. Each of the leaf springs has at least one spring component 7a formed as a right angle bend, which extends in the axial direction, can be longitudinally extended and be used in a manner similar to that of a diaphragm which is conventionally used in prior art probes. The leaf springs also provide a certain flexibility in the direction of two other coordinates. By a corresponding selection of the geometry and the elasticity range of the leaf springs, the multi-coordinate probe 1 can be provided with the same characteristic curve of the measuring force, also called stiffness, in the direction of coordinates X, Y, Z.

The measuring pick-ups or sensors 13 are arranged between the arms of the leaf springs 7 and between the planes of the leaf springs. When a deflecting force acts on the feeler ball 5 in the X- or Y- direction, the spacer pin performs a rocking motion together with its pole P. The optical axis of the scanning head 13b of the sensor 13 extends through the pole P and perpendicular to the measuring surface 13a of the sensor 13. As a result of such arrangement of the sensor 13, the distance between the scale 13a and the scanning head 13b does not change with small deflections of the feeler ball 5 or the tracer pin 4.

The sensors 13 used in the probe according to the present invention are formed as photoelectrical length measuring devices having their measuring axes intersecting in the center 15 of the feeler ball 5, which center 15 forms a so-called scanning pole.

While the measuring axes, which correspond to the measuring direction, intersect at the center 15 of the feeler ball 5 (at the scanning pole) the optical axes of the scanning heads 13b of the sensors 13 extend perpendicular to respective measuring axes of the sensors 13 and form portions of a sphere having its center in the center 15 of the feeler ball 5.

When the feeler ball 5 engages a scanned object or workpiece, it is deflected by the object, which deflection causes deformation of the springs 7. The deformation of the spring 7 results in a change of a relative position of the scale 13a and the scanning head 13b. In response to the change of the relative position of the scale 13a and the scanning head 13b, the sensor generates an output signal, which forms a basis for calculation of the displacement of the feeler ball 5 in X-, Y-, and/or Z- directions.

When the feeler ball 5 operates in an operational mode, which in professional language is called "scanning" or "digitization", the deviation of the feeler ball need be very small so that the rest position of the scale 13a remains substantially unchanged.

This provides the advantage of a very simple construction of a scanning multi-coordinate probe. The simple construction of the probe permits to achieve a very high precision, because no mechanical deformations occur except the bending of the spacer pin which can be easily taken into consideration by appropriate calculations. The measuring range of this operational mode is rather narrow, however, it is sufficient for certain applications. The measuring values can be calculated on the basis of signal generated by sensors with an aid of a very simple algorithm.

Specifically, if S1, S2, S3, S4 are signals generated by the sensors 13, there exist, when four sensors 13 are used, in the half of respective coordinates X or -Y and Y or -X, in the first approximation, a following mathematical interrelation:

$$X=(S1-S2)\times(\sin\alpha)/2=Cs\times(S1-S2)$$

$$Y=(S3-S4)\times(\sin\alpha)/2=C1\times(S3-S4)$$

$$Z=(S1+S2+S3+S4)\times\cos\alpha/4=C2\times(S1+S2+S3+S4)$$

The generation of a simple switch signal requires simply a corresponding selection of appropriate sensors. The selected sensor may be a range sensor formed as a proximity switch or to have a similar function.

Naturally, incremental or encoded measuring systems can be used as sensors, which can be formed as photoelectric measuring systems or be formed on a basis of another physical principle. Such systems are shown in FIGS. 1 and 2.

To facilitate understanding of the figures, the operationally similar structural elements are designated with the same reference numerals having an index corresponding to the figure number.

Figure 2:
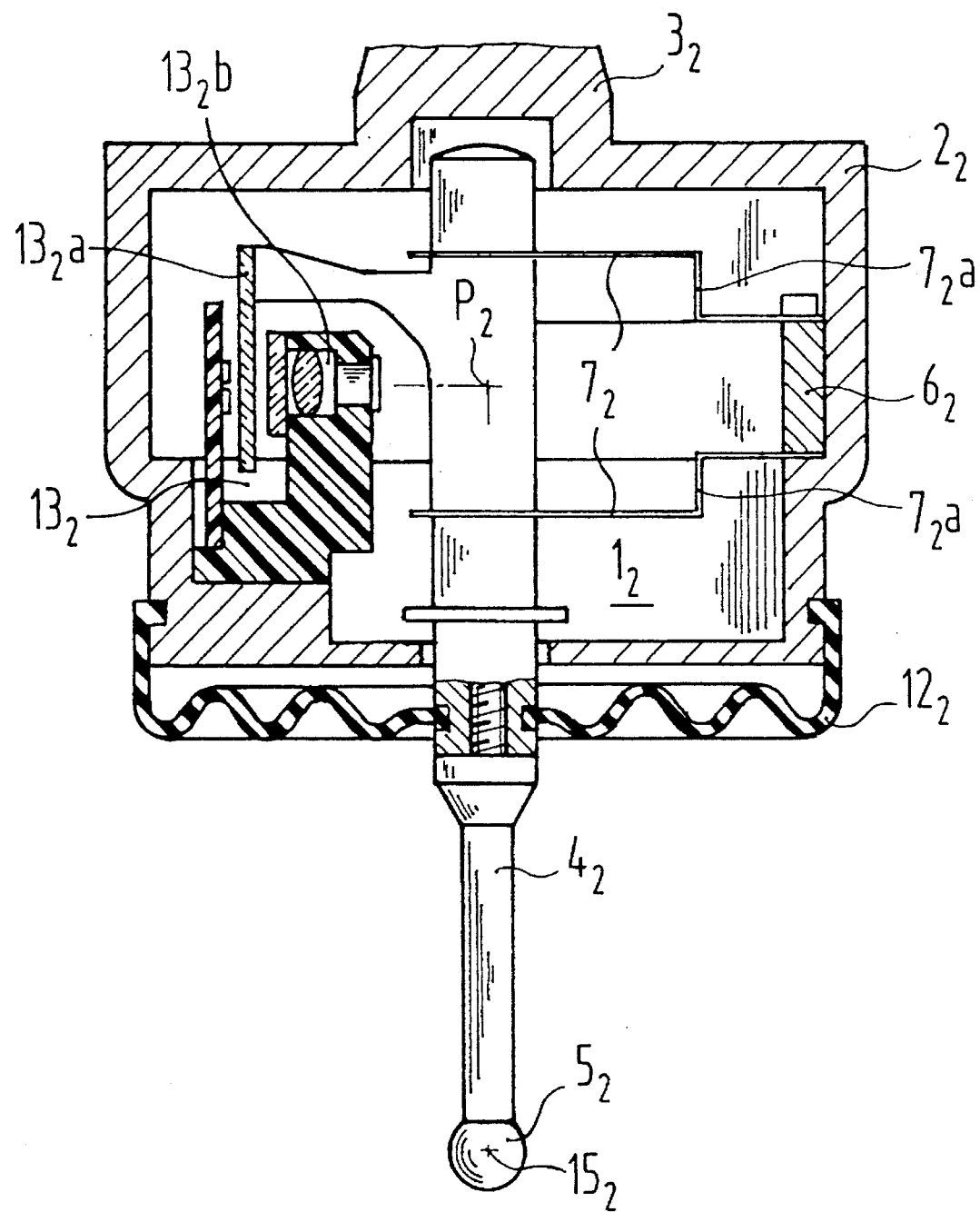
FIG. 2 shows a view similar to that of FIG. 1 with a different position of the sensors.

A multi-coordinate probe 12 shown in FIG. 2 includes a housing $2_2$ with a shaft $3_2$, and a spacer pin $4_2$ displaceably supported in the housing $2_2$ by appropriate support means. The support means includes spring means $7_2$ formed of two cross-shaped leaf springs $7_2a$ and $7_2b$ which are formed that a large lift in axial direction is possible.

In the embodiment of FIG. 2 the measuring direction or measuring axes of the sensors 13a (the scale $13_2a$) extend parallel to the axis of the tracer pin 42. The optical axis of the scanning head intersects the tracer pin axis at a pole $P_2$, about which the tracer pin rocks when deflected in X- or Y-direction.

In the embodiment of the probe shown in FIG. 2, the deflection of the tracer pin $4_2$ cannot be measured directly in the X- and Y- directions. However, after an appropriate calibration, the deflection in the X- and Y- direction, the rocking movement of the tracer pin $4_2$ can provide for a sufficiently accurate direct measurement in the X- and Y- direction.

When the leaf spring has three arms, only three sensors are required.

While the present invention was shown and described with reference to the preferred with reference to the preferred embodiments, various modification thereof will be apparent to those skilled in the art and, therefore, it is not intended that the invention be limited to the described embodiments or the details thereof, and departures may be made therefrom within the spirit and scope of the appended claims.

What is claimed is:

1. A multi-coordinate probe, comprising:

a housing;

at least one tracer pin for scanning an object;

resilient means for supporting the tracer pin in the housing with a possibility of deflection of the tracer pin in a plurality of coordinate directions upon engagement with the object, said resilient supporting means comprising a plurality of multi-arm leaf springs with each arm of at least one of said leaf springs having an axially extending spring component spaced from both ends of the arm;

a plurality of sensors supported in the housing for detecting displacement of the tracer pin upon the engagement of the tracer pin with the object;

wherein the tracer pin has at an end thereof a feeler ball having a center which defines a scanning pole, and wherein the sensors have respective measuring axes which intersect at the scanning pole.

2. A multi-coordinate probe, comprising:

a housing;

at least one tracer pin for scanning an object;

resilient means for supporting the tracer pin in the housing with a possibility of deflection of the tracer pin in a plurality of coordinate directions upon engagement with the object, said resilient supporting means comprising a plurality of multi-arm leaf springs with each arm of at least one of said leaf springs having an axially extending spring component spaced from both ends of the arm;

a plurality of sensors supported in the housing for detecting displacement of the tracer pin upon the engagement of the tracer pin with the object;

wherein each sensor comprises a photo-electrical length measuring device having a scale and a head for scanning the scale, the scanning head having an optical axis, which extends at a right angle to the measuring axis defined by the scale and which intersects an axis of the tracer pin at a tracer pole.

3. A multi-coordinate probe, comprising:

a housing;

at least one tracer pin for scanning an object;

resilient means for supporting the tracer pin in the housing with a possibility of deflection of the tracer pin in a plurality of coordinate directions upon engagement with the object, said resilient supporting means comprising a plurality of multi-arm leaf springs with each arm of at least one of said leaf springs having an axially extending spring component spaced from both ends of the arm;

wherein each of the plurality of leaf springs has four arms forming a cross-shaped leaf spring.

4. A multi-coordinate probe, comprising:

a housing;

at least one tracer pin for scanning an object;

resilient means for supporting the tracer pin in the housing with a possibility of deflection of the tracer pin in a plurality of coordinate directions upon engagement with the object, said resilient supporting means comprising a plurality of multi-arm leaf springs with each arm of at least one of said leaf springs having an axially extending spring component spaced from both ends of the arm;

wherein the axially extending spring component is defined by a right-angle bend of the arm.

5. A multi-coordinate probe as set forth in claim 4, wherein the arms of the at least one leaf spring have each two portions defined by the right-angle bend and located in two parallel planes extending perpendicular to a longitudinal axis of said tracer pin.

6. A multi-coordinate probe as set forth in claim 4, further comprising a plurality of sensors supported in the housing for detecting the displacement of the tracer pin upon the engagement of the tracer pin with the object, with each of the plurality of sensors being located in a space between two adjacent arms of the at least one multi-arm leaf spring.

* * * * *